United States Patent [19]

Polley

[11] 3,927,252

[45] Dec. 16, 1975

[54] BIASED VIDEO DISC STABILIZER SYSTEM

[75] Inventor: Eugene J. Polley, Lombard, Ill.

[73] Assignee: Zenith Radio Corporation, Chicago, Ill.

[22] Filed: Apr. 2, 1974

[21] Appl. No.: 457,289

[52] U.S. Cl. ........ 179/6.7 R; 179/100.3 V; 360/103

[51] Int. Cl.² ...................... G11B 15/64; G11B 7/08

[58] Field of Search ............ 179/100.3 V, 100.41 L; 360/103, 102; 178/6.7 R

[56] References Cited

UNITED STATES PATENTS

| | | | |
|---|---|---|---|
| 3,812,535 | 5/1974 | Higgins | 360/103 |
| 3,818,506 | 6/1974 | Kelch et al. | 360/130 |
| 3,829,622 | 8/1974 | Elliot | 360/103 |

*Primary Examiner*—Bernard Konick
*Assistant Examiner*—Alan Faber
*Attorney, Agent, or Firm*—John J. Pederson; Cornelius J. O'Connor

[57] ABSTRACT

A video disc stabilizing system wherein two spatially related stabilizer blocks have substantially horizontal, confronting surfaces. The stabilizer blocks are in such close juxtaposition with each other that aerodynamic forces are created between the surfaces of the blocks and the respective sides of the video disc which spins in the space between the confronting surfaces. One of the stabilizer blocks is fixed to a laser head apparatus through which a laser beam is transmitted onto the information-bearing surface of the video disc. The second stabilizer block is gimbal-mounted on a flexure ring and coupled to a coil spring, both of which allow the second stabilizer block to be moved by aerodynamic force variations that are generated in the space between the stabilizer blocks in response to thickness non-uniformities in the record disc passing through the space between the blocks. The coil spring is coupled to a linearly sloped cam so that the spring force exerted on the second stabilizer block is varied from the periphery to the center of the disc as the aerodynamic forces between the spinning disc and the stabilizer block surfaces change with varying lineal speed of the record medium through the gap.

9 Claims, 6 Drawing Figures

BIASED VIDEO DISC STABILIZER SYSTEM

BACKGROUND OF THE INVENTION

The present invention relates to an aerodynamic device for stabilizing a spinning video disc at the point of reading the information stored on the disc. The invention is especially useful in video disc players of the optical pickup type, in which a focused light beam is used for reading the information recorded on a surface of the spinning disc, and will be described in that application.

With the high density of information stored on video discs, it is imperative that the reading of that information be precise to assure a good pictorial reproduction of the stored information. To do this, it is desirable that the reading point on the disc be fixed with respect to the optical head. Prior methods of stabilizing spinning discs utilize fixed confronting stabilizer blocks disposed a given distance from each other with the video disc spinning through the space beteween the blocks. The disc is centered between the stabilizer blocks in response to aerodynamic forces generated when the disc spins through the space between the blocks.

When the disc spins at a predetermined rate of speed, a certain amount of air is carried along on the surfaces of the disc. As the disc passes between the confronting blocks, the air carried into this air space by the disc is compressed as it is transported through the separations between the surfaces of the video disc and the stabilizer blocks. This compression results in the development of net aerodynamic forces between the surfaces of the video disc and the surfaces of the stabilizer blocks.

For a given stabilizing device configuration, the net aerodynamic force is proportional to the inverse of the square of the gap and linearly proportional to the speed of the spinning disc. Vertical displacement of the disc alters the separations between the disc and the stabilizer blocks and produces a force imbalance on the disc tending to restore it to a stable, balanced position.

In the present state of the art, a typical optical head-to-disc dimension is approximately 0.47mm with a 2 to 3 micron critical tolerance for the beam focus. With a disc having a nominal thickness of 150 microns and having thickness variations of ± 3 to 5 microns, it is readily apparent that the thickness variations are on the same order as the critical tolerances associated with the focal plane. In the prior art systems, a ± 3 to 5 micron thickness variation in the spinning disc causes a change in the separation between the information-bearing surface of the video disc and the optical head. A condition of equilibrium, in which the aerodynamic forces on both surfaces of the disc are in balance, is attained when the geometric center-plane of the video disc coincides with the geometric mid-plane between the two stabilizing devices. Dependent upon the nature of the thickness non-uniformity, i.e., whether or not it is symmetrical with respect to the center-plane, the position of the disc may or may not shift; however, with any type of thickness non-uniformity the information-bearing surface shifts, resulting in a change in the separation between the optical head and the information-bearing surface, and thus in an atrophic picture. This shift is undesirable for optimum player performance in that the recorded signal is not properly detected when the information surface and the beam's focal plane do not coincide. The variations in the thickness of the disc, though minute, have definite adverse effects on the picture quality because of the high density of information recorded on the disc and the methods available for detecting and developing the recorded information.

The existing methods of stabilizing the disc, although sufficient for mere stabilization of the disc, are insufficient for continuous precise reproduction of the stored video signal with an optical beam.

The present art utilizes a fixed gap of 200 to 250 microns between the stabilizing devices, i.e., an excess of 50 to 100 microns over the nominal thickness of the standard disc. This fixed gap prevents the possibility of utilizing discs of different thicknesses, on the order of 200 to 250 microns, in these fixed dimension video players. Although it is primarily desirable to maintain a fixed separation between the informational surface of the video disc and the optical head, it is also desirable to overcome the fixed gap limitation, thereby providing versatility in the type of disc the player may utilize.

PRIOR ART

"The Development of the Flexible-Disk Magnetic Recorder," R. T. Pearson, PROCEEDINGS OF THE IRE, January, 1961, page 164.

"Design and Analysis of Self-Acting Gas-Lubricated Slider Bearings for Noncontact Magnetic Recording," THE AMERICAN SOCIETY OF MECHANICAL ENGINEERS, November, 1965.

SUMMARY OF THE INVENTION

The invention is utilized in a player which plays flexible record discs having recorded signal information on one surface of the disc. These discs are often subject to thickness non-uniformities. The player embodying the invention includes a stationary element consisting of a reference surface and a drive system including a spindle and hub for spinning the record disc at a predetermined speed in a plane spatially related to the reference surface. Also included in the player is a stabilizer block which confronts the reference surface to form a space for receiving the spinning disc. The stabilizer block and the reference surface are in such close juxtaposition that aerodynamic forces between the block, the reference surface and the disc are created when the disc spins through the space at a predetermined speed. The player utilizes an optical pickup system comprising a focused light beam which is projected onto the information-bearing surface of the disc, modulated thereby, and translated to a light detector which develops a signal that corresponds to the information stored on the record surface. The stabilizer block is biased for movement toward or away from the reference surface in response to variations in the aerodynamic forces between the block, the reference surface and the disc. This movement correspondingly varies the space between the block and the reference surface and in so doing stabilizes the disc in such a manner as to maintain the information-bearing surface of the record in the focal plane, despite any thickness non-uniformities in the disc.

OBJECTS OF THE INVENTION

It is an object of the invention to provide a video disc player comprising an improved means for stabilizing the spinning video disc.

It is a further object of the invention to provide a video disc player having means to compensate automatically for undesired thickness non-uniformities in the spinning disc.

Another object of the invention is to provide a video disc player of the type comprising an aerodynamic stabilizer, which is capable of accommodating and playing video discs of different thicknesses.

BRIEF DESCRIPTION OF THE DRAWINGS

The features of the invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

DESCRIPTION OF THE PREFERRED EMBODIMENT

Figures 1, 2:
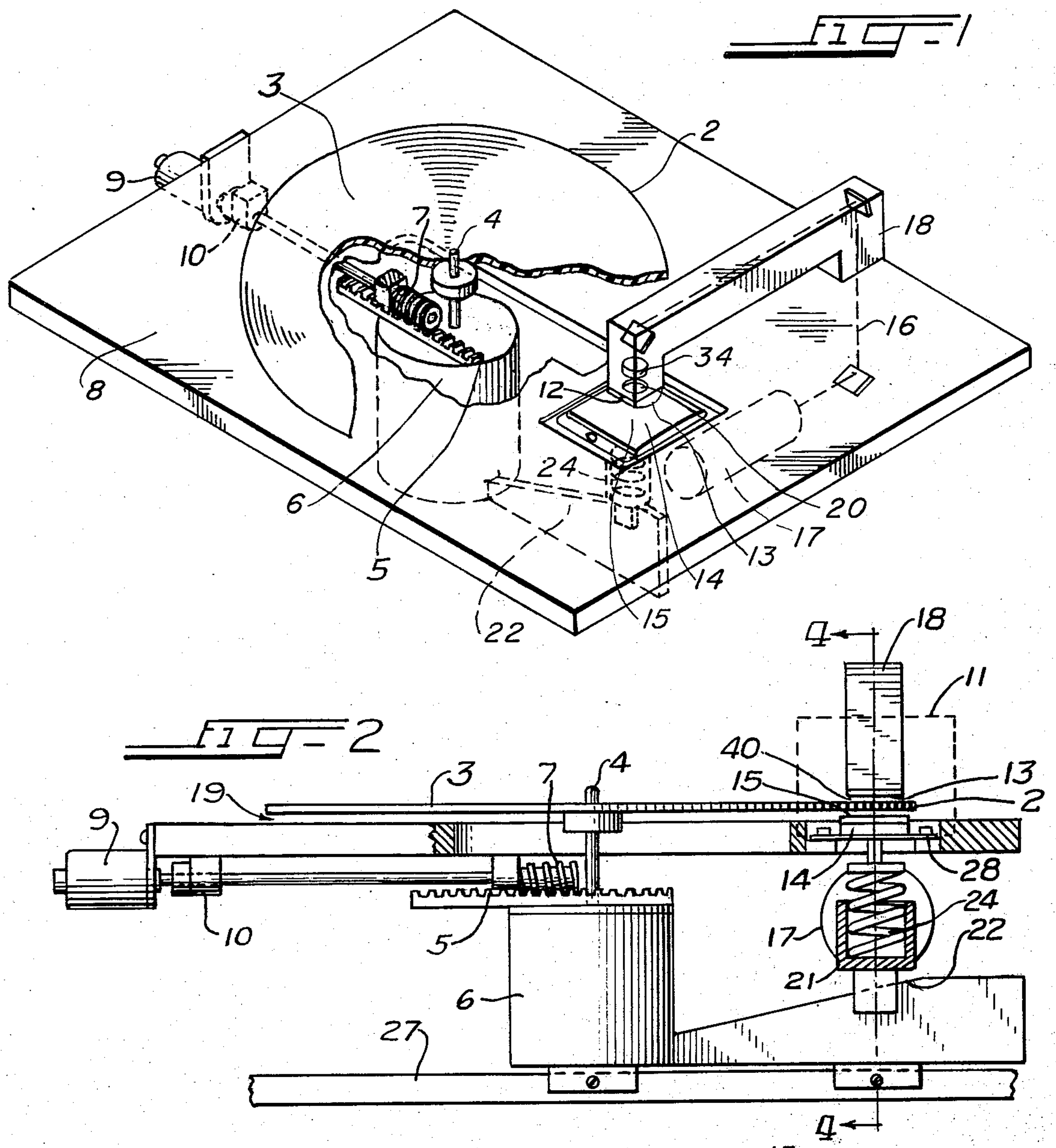
FIG. 1 is a top perspective view of a video disc player embodying the invention.
FIG. 2 is a side view of the player of FIG. 1.
Figure 3:
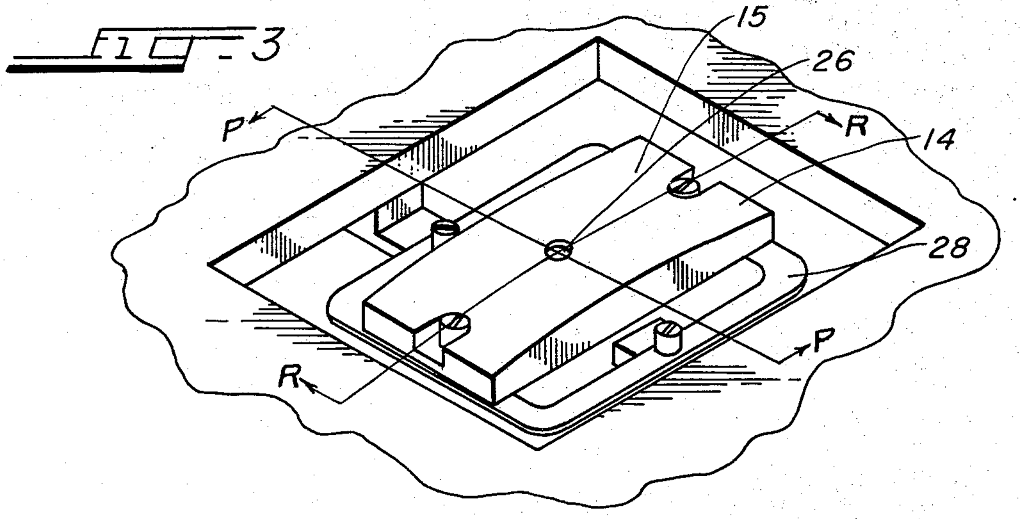
FIG. 3 is an enlarged perspective view of a portion of the player of FIG. 1.

A video disc player utilizing an optical detection system is shown in FIG. 1. The player comprises a baseplate 8 and a motor 6, the latter being coupled to a spindle and hub mechanism 4 about which a flexible video disc 2 is rotated. A coherent light beam is developed by a laser 17 for projection through a series of mirrors and lenses along a path 16 which extends through a pickup head 18, an optical head 34 being fixed relative to a stabilizer block 12 having a reference surface 13, and through a port 20 in stabilizer block 12 onto an information-bearing surface 3 of the flexible video disc. The beam is focused at a focal plane which substantially coincides with the information-bearing surface during the operation of the video disc player. The housing of motor 6 includes a threaded bracket 5 which receives a rotatably mounted lead screw 7. A coupling 10 is fitted to one end of the lead screw, coupling the lead screw to a driver 9 which comprises an electric motor and coupling apparatus designed to coordinate the radial displacement of the spindle and hub mechanism with the rate the optical reading apparatus reads the circular information tracks on the video disc.

Figure 4:
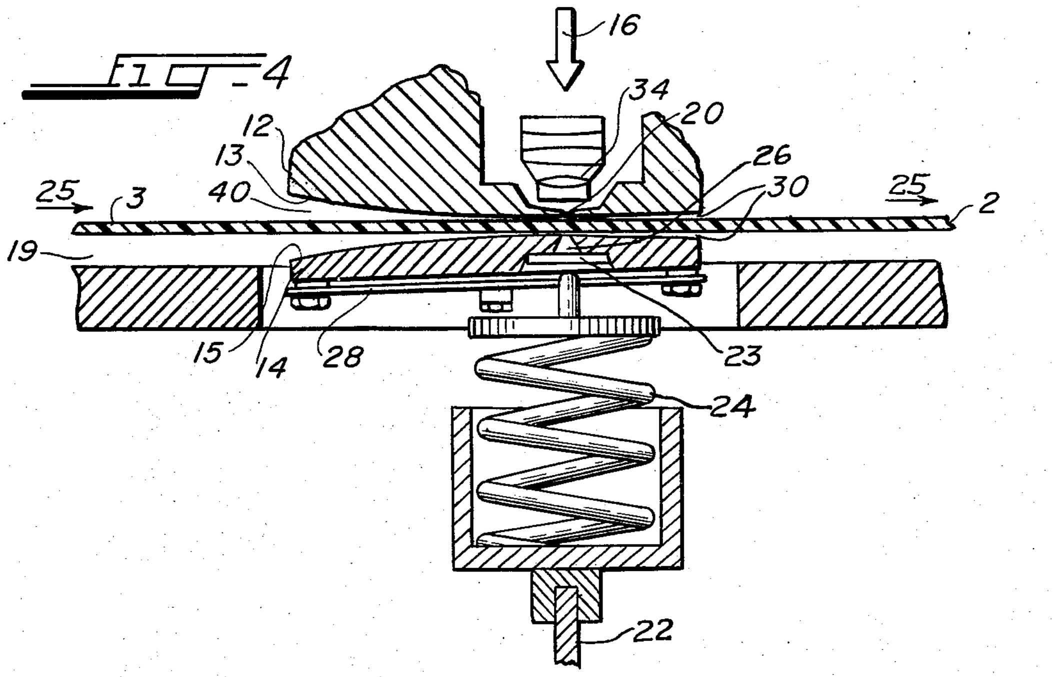
FIG. 4 is a partial cross-sectional view of a portion of the player of FIG. 1.

FIG. 4 displays an enlarged view of stabilizer block 12 comprising optical head 34 and confronting a second stabilizer block 14, with the video disc 2 spinning in the gap between the substantially horizontal surfaces of the two stabilizer blocks. Each of the blocks has a port through which the laser beam is translated. The lower block's port 26 allows the laser beam, modulated by information stored in circular tracks on the surface of the disc, to be transmitted onto a photodetector 23 located on the underside of the block. The photodetector develops a signal corresponding to the signal on the information-bearing suface.

As in prior video disc systems the video disc 2 is rotated by the motor-driven spindle and hub mechanism 4. Viscous pumping effects force a layer of air to flow between the spinning disc and the video player's baseplate 8, forcing and maintaining a separation 19 between the player baseplate and the spinning disc as shown in FIG. 2. As the rotating disc appproaches and achieves its operating speed, lead screw 7 and threaded bracket 5 interact to position the disc in the gap between substantially horizontal surfaces 13, 15. If desired, provision may be made for holding stabilizer block 14, comprising surface 15, in a retracted position until the operating speed, approximately 1800 RPM's, is achieved, whereupon it may be established in an operating position in which a 25 to 50 micron separation is maintained between each respective disc surface and the stabilizer surface located closest thereto. The speed of driver 9, the design of coupling 10, and the pitch of the threads on lead screw 7 and bracket 5 are designed to synchronize the radial movement of the spindle-hub-spinning disc assembly with the focused-beam scanning of the circular track of stored information. It is to be noticed this design provides means for moving the spindle-hub-spinning disc assembly radially, positioning the disc between the stabilizer surfaces; however, it is equally possible, for purposes of the present invention, to move the optical head-stabilizer apparatus radially across a radially stationary spinning disc.

Stabilizer blocks 12 and 14 have a general configuration displaying rounded, confronting surfaces with the radius of curvature varying from a very large, in fact almost flat, radius at the leading edge, as shown by arrows 25 showing direction of disc rotation, of the stabilizer blocks to a small radius of curvature at the lagging edge of the stabilizer blocks. The radius of the confronting surfaces, which is essentially the configuration of the surfaces, determines the pressure distribution across the surfaces of the respective blocks. The radii of the confronting surfaces thereby effect some control on the stability of the disc as it spins through the gap between the stabilizers. The decreasing radius of curvature from the leading to lagging edge of the respective stabilizer blocks results in a gap at the leading edge of the stabilizer surfaces that is sufficiently greater than the gap at both the point where the beam is projected through the stabilizers, i.e., where the information on the disc is read and where the gap is the smallest, and the gap at the lagging edge of the stabilizer surfaces. This wedge-shape gap permits a sufficient amount of air to flow between the leading edges of the stabilizer blocks and the respective disc surfaces to stabilize the spinning disc in a central position within the gap as it passes between the stabilizer blocks.

As the disc passes between the stabilizer surfaces, a pressure-gap relationship is developed between the stabilizer surfaces and the respective surfaces of the disc. As variations in the thickness of the disc or disc non-uniformities pass between the stabilizer surfaces, the pressure-gap relationship effects a changing aerodynamic force on the disc and stabilizer surfaces. Depending on the nature of the thickness variation or non-uniformity, that is, whether or not it is symmetrical with respect to the center plane of the disc, the position of the disc may or may not shift; however, with any type of thickness variation or non-uniformity the information-bearing surface shifts, resulting in a change in the separation between the fixed reference surface and the information-bearing surface and consequently in movement of the information-bearing surface out of the beam's focal plane. This shift is detrimental to optimum player performance in that the recorded signal is not properly detected when the information-bearing surface and the beam's focal plane do not coincide. The typical laser beam's depth of focus has a critical tolerance of approximately 2 to 3 microns, and thus typical disc thickness variations or non-uniformities on the order of 3 to 5 microns cause the information-bearing surface to move to a position where the beam does not focus and the resulting picture is atrophic.

In accordance with the invention, instead of having the confronting stabilizer blocks 12 and 14 fixed relative to each other as in prior art systems, the latter block is resiliently biased by a vertically mounted coil spring 24 captivated in compression within a housing 21 which is slidably secured on a linearly sloped cam 22 coupled to the housing of the spindle and hub drive motor 6. The worm screw type action of lead screw 7 and bracket 5 cause motor 6 and cam 22 to traverse on a rail 27. Contemporaneously the spindle-hub-spinning disc assembly positions the spinning disc's circular information tracks beneath the optical beam. As the information is radially tracked and detected by the beam, the lead screw and bracket assembly cause the disc to traverse radially into the stabilizer head 11, the area shown by dotted rectangular lines, commencing at the disc periphery and moving towards its center.

The aerodynamic forces generated between the respective disc and stabilizer surfaces are proportional to the lineal speed of the disc through the gap and are therefore greater at the periphery than at the center of the disc. At the slower lineal track speeds associated with the inner part of the recording, smaller aerodynamic forces are generated, and the changes in aerodynamic force occasioned by a given variation in disc thickness are also reduced. As shown in the preferred embodiment of the invention, means are provided for varying the external biasing force applied by vertical coil spring 24 to compensate for the changes in aerodynamic forces as the disc moves radially into the stabilizer head. The linear sloped cam is used to implement this external force variation. As the disc is moved further into the gap between the stabilizer blocks, spring housing 21 rides down the cam 22 so that the compression of spring 24 is relaxed to reduce the biasing force applied to stabilizer block 14. This increases the responsiveness of stabilizer block movement to unit aerodynamic force changes as these changes diminish in amplitude. By suitable correlation of the biasing force of spring 24 and the slope of cam 22 with the speed of the disc and the nominal or average gap between the stabilizer blocks, the displacement between the optical head 34 and the information-bearing surface 3 of the disc can be maintained substantially constant.

In a preferred embodiment of the invention, the operating position of stabilizer block 14, with respect to stabilizer block 12, is such that an approximate 2 mil operating separation exists between each disc surface and the stabilizer surface disposed closest thereto. This separation is established by aerodynamic counterforces of approximately 25 grams each which are exerted on both sides of the spinning disc. As variations in the thickness of the disc or non-uniformities pass between the stabilizers, the aerodynamic forces on the disc and stabilizer surfaces vary, thereby causing the biased stabilizer 14 to move vertically in response to these force variations. The force variations on the disc are approximately 10 grams per every mil change in separation between the disc surfaces and the corresponding stabilizer surfaces. Therefore, a 1 mil thickness variation in the disc creates a 10 gram force variation between the disc surfaces and the stabilizer surfaces. The resistance of spring 24 is approximately 1/10 of the force variations on the disc, or about 1 gram per mil. This spring constant, being considerably less than the effective spring constant of the air film between the disc and the stabilizers, enables spring-biased stabilizer 14 to react instantaneously to force variations caused by thickness variations or non-uniformities in the spinning disc. The slope of cam 22, (which is exaggerated in FIGS. 1 and 2), is on the order of approximately 10:1 or 5:1 in the downward direction towards the center of the disc, the location of the cam being in the same vertical plane as the spindle and the beam's focal point on the spinning disc.

Figure 6:
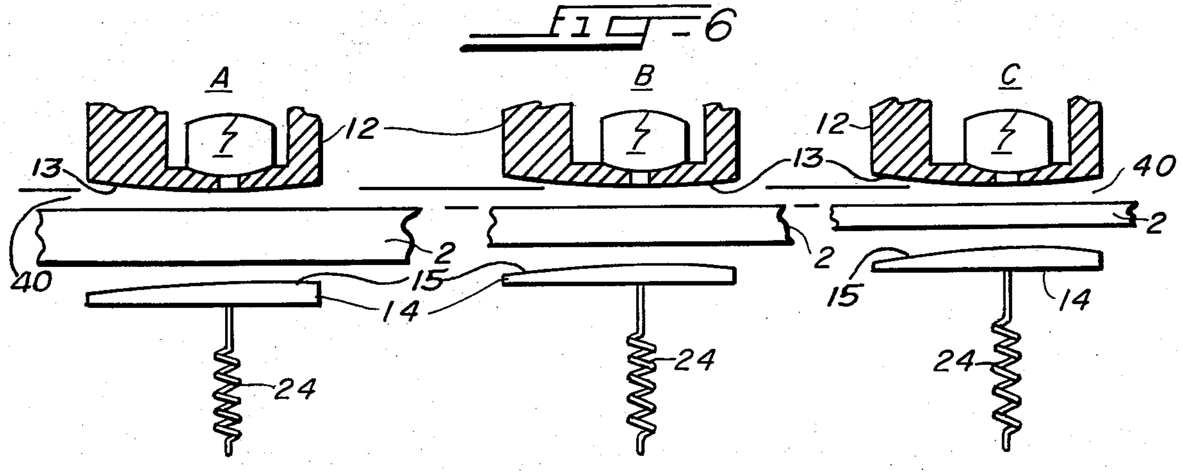
FIGS. 6A, 6B and 6C are exaggerated fragmentary, schematic views of the stabilizer block system showing its operation with variations in record disc thickness.

FIGS. 6A, 6B and 6C exemplify those typical operating conditions that a system in accordance with the invention may accommodate. Although exaggerated in FIGS. 6A, 6B and 6C, the relative disc thicknesses and fixed stabilizer-to-disc separation 40 typify the manner in which the system responds to discs having overall thickness differences. FIG. 6B represents a video disc of a desired thickness rotating between fixed stabilizer 12 and biased stabilizer 14. As the disc passes between the stabilizer surfaces the aerodynamic forces developed on the stabilizer surfaces are equalized by an external upward spring force on the biased stabilizer. This balancing of forces develops a state of equilibrium to develop and maintain the preferred constant separation 40 between surface 13 and information-bearing surface 3. This contemporaneously maintains the beam's focal plane and the information-bearing surface coincident.

A disc having a greater overall thickness than the desired disc thickness represented by FIG. 6B is shown in FIG. 6A. When the thicker disc passes between the stabilizer surfaces the aerodynamic forces on the stabilizer surfaces increase; being greater than the spring force exerted on stabilizer 14 by spring 24 the aerodynamic force on surface 15 forces the biased stabilizer 14 to move in a vertical direction away from stabilizer 12 to a new equilibrium level where the aerodynamic forces and the spring force are again equal. This contemporaneously maintains the desired constant separation 40. A disc having an overall thickness less than the desired thickness represented by FIG. 6B is typified by FIG. 6C. Like the operating condition of the thicker disc just described the aerodynamic forces vary as the thinner disc passes between the stabilizer surface. With the thinner disc passing between the stabilizer the aerodynamic forces against the stabilizer decrease. The spring force on stabilizer 14 by spring 24 now being greater than the aerodynamic counter-force on stabilizer surface 15 causes stabilizer 14 to move vertically towards stabilizer 12 to an equilibrium level contemporaneously balancing the spring and aerodynamic forces and maintaining the desired constant separation 40 between surface 13 and information-bearing surface 3.

FIGS. 6A and 6C also represent, in an exaggerated manner, the conditions encountered momentarily when slightly thicker or thinner portions of a disc of nominal thickness represented in FIG. 6B pass between the stabilizer blocks. The biasing system for the lower stabilizer block 14 is designed to permit spring 24 to respond virtually instantaneously to even minor aerodynamic force changes so that the total gap width expands and contracts to follow disc thickness nonuniformities. In particular, to this end, spring 24 is made of low mass, high spring constant, and long extension and is only very slightly compressed in the minimum-gap condition represented by FIG. 6C.

The preferred embodiment of the invention displays a further improvement, showing spring-biased stabilizer 14 gimbal-mounted on a spring flexure ring 28 thereby providing two additional degrees of freedom in which the stabilizer may move. Like the coil spring, the gimbal-mounting ring has a spring constant sufficiently small in comparison to the stiffness of the air between the respective disc and stabilizer surfaces to allow it to respond to changes in the aerodynamic forces. Practice has shown that the deflection of spring 28 absorbs some of the aerodynamic force changes on stabilizer surface 15 by allowing the stabilizer to pivot on its pitch P-P and/or roll R-R axes in response to the aerodynamic force changes. The ring similarly responds to follow any variation in angle that the spinning disc takes as it approaches and spins between the stabilizer blocks, thus avoiding undesired non-uniform pressure distribution between the respective disc and stabilizer surfaces. Consequently, improved stabilization of the disc and more accurate detection of the video information are achieved.

Figure 5:
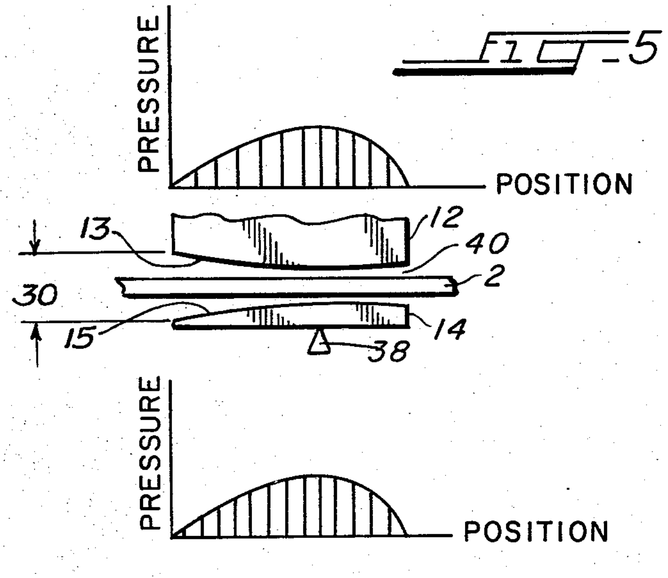
FIG. 5 is a schematic view of the stabilizer blocks of the player of FIG. 1, in conjunction with graphical representations of the aerodynamic pressure distribution between the stabilizer blocks and the video disc at various points.

FIG. 5 shows the pressure distribution across the confronting surfaces of the stabilizer blocks. From the upper and lower curves, associated with surfaces 13 and 15 respectively, it is evident that the distribution is dependent on the configuration of the stabilizer blocks. For optimum picture quality, the optical reading beam should be focused on the disc surface at a point where the distribution curve shows the pressure to be a maximum. The pivot position 38 preferably corresponds to the point of application of the vertical biasing force by spring 24. The desired pivot position for optimum disc stabilization corresponds to the point where the integral of the aerodynamic pressure field moments on the stabilizer surfaces equals $0\int_A P\cdot l\cdot dA=0$, where l is the moment arm, P is the pressure at any one point on the stabilizer surface, and A is the area of the stabilizer surface. The pressure distribution being related to the configuration of the stabilizer surfaces and the optimum pivot point being related to the configuration of the surfaces implies a relationship between the optimum pivot point and the pressure distribution across the surfaces of the stabilizer. As shown in the preferred embodiment this relationship results in substantially direct alignment of the maximum pressure point and the optimum pivot position.

The objectives of providing a video disc player comprising improved means for stabilizing a spinning video disc, means to compensate automatically for undesired thickness nonuniformities and means to accommodate video discs of different thicknesses have been met.

The invention is not limited to the particular construction of the embodiment depicted and other modifications are contemplated. Certain changes may be made in the abovedescribed apparatus without departing from the true spirit and scope of the invention herein involved and it is intended that the subject matter in the above depiction shall be interpreted as illustrative and not in a limiting sense.

I claim:

1. A player for utilizing a record disc having a surface bearing recorded signal information, which disc may be subject to undesired thickness non-uniformities, said player comprising:

a stationary stabilizing element having a curved reference surface;

a drive system including a spindle and hub for supporting and spinning said disc at a predetermined speed in a plane spatially removed from said stationary reference surface;

a displaceable stabilizer block having a curved surface, disposed in a confronting relation to said stationary reference surface to form a wedge-shaped gap for receiving the spinning disc, said displaceable stabilizer block being in such close juxtaposition to said stationary reference surface as to generate aerodynamic forces between said stabilizer block, said stationary reference surface, and said disc when said disc is spinning through said gap at said predetermined speed, which forces tend to maintain said spinning disc in a state of equilibrium between said stabilizer block and said reference surface;

an optical detection system including means for projecting a focused light beam onto the information-bearing surface of said spinning disc and a light detector for receiving the light beam as modulated by the recorded signal information and developing a corresponding output signal; and means for resiliently biasing said displaceable stabilizer block for movement toward or away from said stationary surface, said means being responsive to variations in said aerodynamic forces to effect changes in the spacing between said stabilizer block and said stationary reference surface that stabilize the disc and maintain said information-bearing surface of said disc in the focal plane of said light beam despite encountering said undesired non-uniformities in said record disc.

2. A player in accordance with claim 1 wherein one of said confronting stabilizers is transmissive enabling said focused light beam to be translated through said block onto the information-bearing surface of the spinning disc.

3. A player in accordance with claim 1 in which said stabilizer biasing means comprises a spring coupled to said stabilizer.

4. A player in accordance with claim 3, wherein said spring comprises a coil spring which is supported so as to compress or elongate vertically along its spiral axis in response to said aerodynamic force variations to effect said changes in spacing between said stabilizer block and said stationary stabilizer.

5. A stabilizer system for a video player utilizing a spinning record disc having one surface bearing recorded information, which disc may be subject to undesired thickness non-uniformities, said player having an optical detection system comprising means for projecting a focused light beam to cast its focal plane onto said surface and a photodiode responsive to said focused beam for developing a corresponding video signal, said stabilizer system comprising:

a fixed stabilizer having a reference surface and a displaceable stabilizer block spatially confronting said surface to form a space for receiving said spinning disc in such close juxtaposition therewith as to generate aerodynamic forces operative to stabilize said disc between said fixed stabilizer reference surface and said displaceable stabilizer block; and means for biasing said displaceable stabilizer block for movement toward or away from said reference surface in response to aerodynamic force changes within said disc receiving space resulting from the undesired disc thickness non-uniformities, said movement of said displaceable stabilizer serving to vary the spacing between said displaceable block and said reference surface to keep said information-bearing surface at a substantially constant distance from said reference surface so as to stabilize and maintain said information-bearing surface in said focal plane.

6. A stabilizer system in accordance with claim 5 in which one of said stabilizer blocks is transmissive in nature enabling the focused light beam to be transmitted through said block onto the information-bearing surface.

7. A stabilizer system in accordance with claim 5, wherein said biasing means comprises a compression spring coupled to the stabilizer.

8. A stabilizer in accordance with claim 7, wherein said spring is a coil spring supported so as to present said displaceable stabilizer to said aerodynamic forces and to respond to said forces by compressing or elongating along its spiral axis to effect changes in the spacing between said displaceable stabilizer block and said fixed stabilizer.

9. In a player of the type in which a record disc having a surface bearing recorded information is rotated between a displaceable stabilizer block and a fixed stabilizer having a stationary reference surface mutually confronting and spaced from each other, for presentation to an optical detection system, a method for stabilizing the plane of rotation of said information-bearing surface with respect to a predetermined focal plane of said optical detection system projected upon said information-bearing surface despite undesired thickness nonuniformities of said record disc, which method comprises:

spinning said disc through said space separating said displaceable stabilizer block and said stationary reference surface to generate aerodynamic forces in a predetermined gap between said information-bearing surface of said disc and said reference surface; and biasing said displaceable stabilizer block for movement toward or away from said reference surface in response to said generated aerodynamic force variations attributable to such undesired disc non-uniformities, to effect changes in the stabilizer block and reference surface spacing to maintain said predetermined gap substantially constant despite such undesired disc non-uniformities.

* * * * *